May 13, 1947.        J. J. DORSEY        2,420,393
MEANS FOR THE HANDLING OF FISH MEAL AND THE LIKE
Filed Dec. 27, 1943
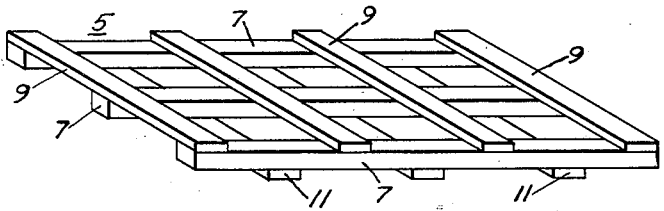
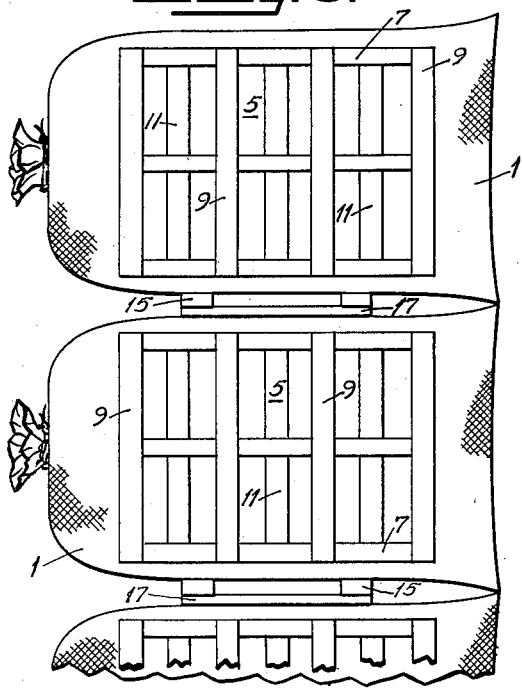
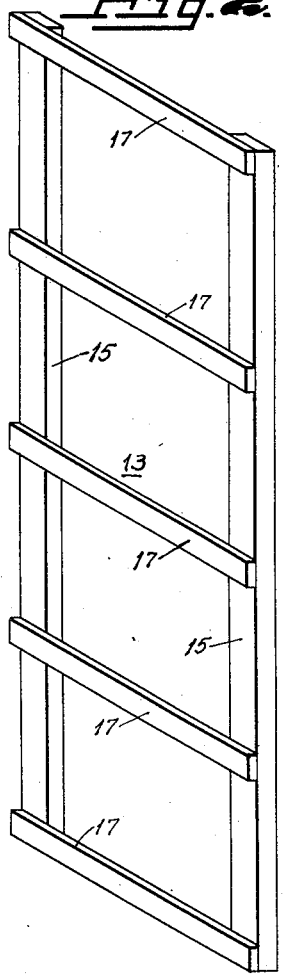
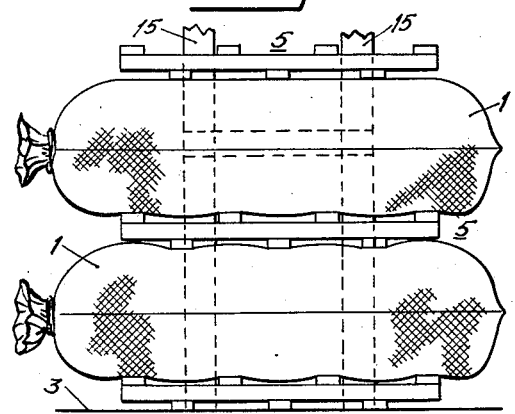
INVENTOR,
JOHN JAMES DORSEY
BY
Charles O. Bruce
ATTORNEY.

Patented May 13, 1947

2,420,393

UNITED STATES PATENT OFFICE 2,420,393

MEANS FOR THE HANDLING OF FISH MEAL AND THE LIKE

John James Dorsey, Bay City, Grays Harbor, Wash.

Application December 27, 1943, Serial No. 515,822

3 Claims. (Cl. 214—10.5)

My invention relates to the preparation and handling of fish meal or the like and has for its objects:

1. To provide a novel and improved method of preparing and handling fish meal or other material subject to spontaneous combustion;
2. To provide a novel and improved method of tempering fish meal or the like to prevent spontaneous combustion thereof during storage;
3. To provide a novel and improved means and method for stacking fish meal for storage purposes;
4. To provide a novel and improved means and method of handling fish meal, which is not only highly efficient, but which is economical in the matter of storage space, labor, etc.

Additional objects of my invention will be brought out in the following description of a preferred embodiment of my improved means and method for the handling of fish meal or other material subject to spontaneous combustion.

In the drawings:

Figure 1 is a view in perspective of an aerating spacer employable in the practice of my invention;

Figure 2 is a view in perspective of a frame capable of use in conjunction with the spacer of Figure 1 in the practice of my invention;

Figure 3 is a plan view, and Figure 4 a view in elevation, illustrating the manner of utilizing the devices of Figures 1 and 2 in the practice of my invention.

In the preparation of fish meal, it is conventional practice to first cook the fish, following which the liquids are pressed therefrom and the press cake remaining is broken up and dried to remove excess moisture. Such drying is facilitated by the grinding of the press cake to the degree of fineness desired and blowing the ground product into a stream of cold air into a cyclone collecting system and packing the material in bags for storage and subsequent handling.

The meal, when in the bags, seems to undergo an organic change and requires curing or tempering to prevent the occurrence of spontaneous combustion, which has in the past been the cause of many serious fires.

In the process of tempering, with which the present invention is primarily concerned, it has been the practice of some manufacturers to stand the bags on end for several days, with space between them to permit of circulation of air among the bags. This requires considerable floor space, in addition to the labor of extra handling, inasmuch as the bags, following the curing period, must be piled for storage. Such method of tempering does not entirely eliminate the possibility of spontaneous combustion, for after the bags are piled for storage, a continuous watch must be maintained to detect signs of localized heat generation which constitutes the initial stage of spontaneous combustion.

Other manufacturers carry out their tempering process by spreading the ground meal on the floor and periodically turning it over, after which the material is packed into bags and stacked for storage purposes.

In accordance with my invention, I pack the material and stack it for storage in such a manner that the contents of the bags is tempered during the storage period, thereby eliminating the tempering of the material as a separate step in the preparation of the same.

The fish meal, after being properly ground to the proper degree of fineness and cooled, is packed into porous or open mesh containers such as burlap bags 1, preferably in 100 lb. size. The bags are stacked for storage purposes, one on top of the other, with the lowermost bag spaced from the floor 3, and the other bags from each other by aerating spacers 5. Each stack of bags is likewise spaced from adjacent stacks, thereby exposing each bag on all sides to the atmosphere. Thus, any heat generated within the contents of any particular bag may be carried away from its source by the natural air currents in the vicinity, or by artificially produced air flow, if desired.

Each of the aerating spacers is preferably formed by joining a plurality of parallel disposed bars 7 of wood or the like with cross slats 9 on one side alternating with cross slats 11 on the other side, this arrangement being of particular significance in the functioning of the device as an aerating spacer.

As can be readily seen from Figure 4, such construction of the spacer maintains positive separation of the bags from each other with ample air space for circulation of air between the bags. Contact between bags in a stack is virtually impossible by the alternate disposition of the slats 9 and 11.

With such a spacer, furthermore, the planes of pressure attributable to the engaging slats on one side of a bag alternate with the planes of pressure attributable to the engaging slats on the other side of such bag, whereby the pressure to which such bag is exposed under conditions of stacking will be more or less uniformly distributed throughout the contents thereof. No pinching can occur such as would develop were the planes of pressure in coincidence instead of being alternately spaced, as pointed out.

The slat construction of the aerating spacers offers the additional advantage of a stabilized pile, due to the fact that the bags cannot roll, one on the other, as when piled directly on one another, for each spacer takes up the surface irregularities in a bag on which it rests and accordingly provides a stable support for the bag placed thereon.

Utilization of the aerating spacers as described greatly simplifies and facilitates the stacking and storaging of the bags with their contents. Thus in this connection, the spacer which ultimately will appear at the bottom of a pile, is placed upon a hand truck, and as a bag is filled and tied, it is placed on the spacer and another spacer placed on top of the bag. This is repeated until the truck is loaded, such truck usually having a capacity of about six bags. The pile is then trucked to the storage location and in view of the stability of the pile, it can be handled as a unit in unloading the same from the truck, as by tilting the pile and withdrawing the truck to leave the piled bags and spacers intact. Thereafter, the bags require no further handling for tempering purposes.

While not essential to the tempering of the contents of the bags, the handling of the piles or stacks is facilitated by the use of a vertically disposed frame 13 between the stacks. This frame is useful not only in keeping the piles of bags separated, but enables the trucker to maneuver a pile onto a hand truck at such time as the bags are to be carted out to a freight car or van for shipping purposes.

Such frames 13 are preferably constructed of a pair of vertical members 15 joined by a plurality of parallel disposed cross pieces 17 so as not to impede the horizontal flow of air current between the piles. Likewise the construction will not block any rising air currents. Thus the frames offer no effective impedance to the flow of any air current between the piles of bags.

From the above description of a preferred form of my invention, it will be apparent that it fulfills all the objects of my invention and, while I have disclosed the manner of practicing my invention in considerable detail, I do not desire to be limited in my protection to such details, except as may be necessitated by the appended claims.

I claim:

1. An aerating spacer for disposition between stacked bags of material subject to spontaneous combustion, comprising a plurality of bars disposed substantially parallel to each other and joined by slats on each side thereof, the slats on one side alternating with the slats on the other side.

2. An aerating spacer for disposition between stacked bags of material subject to spontaneous combustion, comprising a plurality of bars disposed substantially parallel to each other and joined by slats on each side thereof, the slats on one side alternating with the slats on the other side, said spacer covering an area somewhat less than the bag area to be contacted by said spacer.

3. In combination, a plurality of bags of ground material in stacked formation; and an aerating spacer between said bags, said spacer comprising a plurality of bars disposed lengthwise of said bags and substantially parallel to each other and joined by slats on each side thereof substantially crosswise of said bags, the slats on one side alternating with the slats on the other side, whereby contact between adjacent bags is virtually prohibited and said bags are maintained in spaced relationship to each other.

JOHN JAMES DORSEY.

REFERENCES CITED

The following references are of record in the file of this patent:

UNITED STATES PATENTS

| Number | Name | Date |
|---|---|---|
| 897,923 | Ortiz | Sept. 8, 1908 |
| 2,196,470 | Montgomery et al. | Apr. 9, 1940 |
| 2,181,356 | Chipman | Nov. 28, 1939 |
| 1,536,750 | Baldwin | May 5, 1925 |
| 2,150,960 | Bertel | Mar. 21, 1939 |
| 2,075,473 | Schwary et al. | Mar. 30, 1937 |
| 199,975 | Hayes | Feb. 5, 1878 |
| 2,181,357 | Chipman | Nov. 28, 1939 |
| 345,705 | Laraway | July 20, 1886 |
| 954,041 | McDougall | Apr. 5, 1910 |